United States Patent [19]

Maeda et al.

[11] 4,348,225
[45] Sep. 7, 1982

[54] BATCH PROCESS AND STATIC-BED TYPE APPARATUS FOR REDUCING IRON ORE

[75] Inventors: Takuya Maeda; Tsutomu Yamada, both of Kobe; Mitsuharu Kishimoto, Miki, all of Japan

[73] Assignee: Kawasaki Jukogyo Kabushiki Kaisha, Kobe, Japan

[21] Appl. No.: 124,229

[22] Filed: Feb. 25, 1980

[30] Foreign Application Priority Data

Feb. 26, 1979 [JP] Japan .................. 54-22225

[51] Int. Cl.³ .............................................. C21B 13/02
[52] U.S. Cl. .................................. 75/34; 75/91; 266/184; 266/186
[58] Field of Search ...................... 75/33–38, 75/90, 91; 266/46, 184, 138, 144, 160, 171, 155, 186, 168, 156

[56] References Cited

U.S. PATENT DOCUMENTS

| | | | |
|---|---|---|---|
| 2,243,110 | 5/1941 | Madaras | 75/35 |
| 2,591,789 | 4/1952 | De Jahn | 75/34 |
| 2,862,808 | 12/1958 | De Jahn | 75/34 |
| 3,964,898 | 6/1976 | Murray | 75/35 |
| 4,017,305 | 4/1977 | Waslo | 75/34 |
| 4,057,978 | 11/1977 | Sato et al. | 75/33 |
| 4,236,699 | 12/1980 | Davis, Jr. | 75/33 |
| 4,238,225 | 12/1980 | Coccia | 75/33 |

Primary Examiner—M. J. Andrews
Attorney, Agent, or Firm—Dennis P. Clarke

[57] ABSTRACT

Static bed type iron oxide reducing apparatus comprises reduction furnaces and cooling chambers respectively associated with the furnaces. Iron oxides are charged into the furnaces and reducing gas is applied to the raw materials to carry out a reducing reaction. After the iron oxides in the furnace have been metallized to a sufficient level, they are transferred to the cooling chamber to be cooled therein.

9 Claims, 15 Drawing Figures

BATCH PROCESS AND STATIC-BED TYPE APPARATUS FOR REDUCING IRON ORE

The present invention relates to a method and apparatus for reducing iron oxides to iron metals and more particularly to static bed type process.

In this type of iron manufacturing, raw material containing iron oxides is charged into static bed type furnace and reducing agent such as reducing gas is applied thereto under an elevated temperature until the reducing reaction is completed. U.S. Pat. No. 3,136,623 teaches to accomplish the process with four furnaces in combination. According to the teachings of the patent, the whole process is divided into four steps comprising a first reduction step, a last reduction step, a cooling step and a taking out and charging step. The four furnaces are operated in parallel so that in one moment they are in respective ones of the aforementioned steps. In the proposed process, referring to each of the furnaces, the reduced iron is of a high temperature such as 760° to 1100° C. when the final reducing step is completed so that it has to be cooled down to a temperature close to 70° C. for easy handling.

It should therefore be understood that, during the cooling step, the internal wall of the furnace comprised of a refractory material such as bricks is also cooled simultaneously with the reduced iron so that for the succeeding reducing process the furnace wall has to be again heated with iron oxides. Thus, there are substantial losses in time and energy. Further, in the cooling period, the furnace and the facilities such as gas preheaters associated therewith must be left inoperative, so that the facilities are not effectively used.

It is therefore an object of the present invention to provide a method and apparatus for a static bed type iron oxides reduction in which reducing furnaces need not be cooled after each reducing step for taking out reduced iron.

Another object of the present invention is to provide a batch reduction type iron manufacturing technique in which the reducing processes can be carried out with a high thermal efficiency and the reducing furnaces and other facilities can be effectively utilized.

Still further object of the present invention is to provide a method and apparatus for iron manufacturing in which the cooling step is carried in a specifically provided cooling section.

According to the present invention, in order to accomplish the above and other objects, there is provided a batch reduction type iron manufacturing method which utilizes reducing furnace means and cooling chamber means separately provided from the furnace means, the method including steps of charging iron oxides into the furnace means, applying a reducing gas to the raw materials in the furnace means under an elevated temperature to carry out a reducing reaction of the iron oxides in the raw materials, then transferring the materials into the cooling chamber means and cooling them in the chamber means. The material charging step may preferably be preceded by a step of surrounding the raw materials by an inert gas and the material transferring step by a step of surrounding the reduced material by an inert gas. Throughout the specification, the word "inert gas" is used as including those materials that are in essence inert under the temperature which is produced in the furnace during the reducing reaction. Thus, nitrogen may be used for the purpose.

In accordance with a further feature of the present invention, the apparatus for carrying out the above method comprises a plurality of batch reduction furnaces, at least one material hopper associated with the furnaces for charging raw materials containing iron oxides into the associated furnace, at least one cooling chamber associated with the furnaces for receiving materials therefrom, means for passing a reducing gas into selected one of the furnaces, and means for passing a reducing gas to the cooling chamber for cooling the materials therein. Circulating conduit means may be provided for leading the reducing gas from the cooling chamber to the furnaces so that the gas is used for reducing reaction in the furnaces.

According to the present invention, the reduced iron material is therefore cooled in a cooling chamber which is provided separately from the reduction furnaces. The empty furnace can therefore be charged with raw materials when the cooling step for the previously reduced materials is still being carried out in the cooling chamber.

The above and other objects and features of the present invention will become apparent from the following descriptions taking reference to the accompanying drawings, in which:

FIGS. 1(A), (B), (C), (D), (E) and (F) are diagrammatical illustration of the static bed type reduction system showing the sequential steps of carring out the method in accordance with one embodiment of the present invention;

Figure 1A:
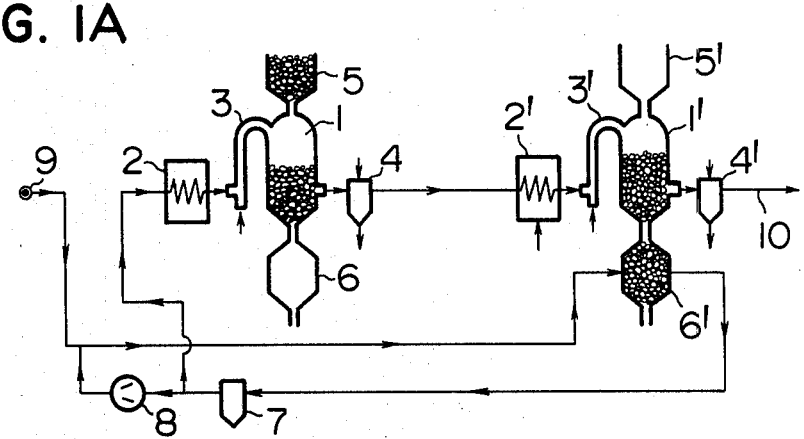

Referring now to the drawings, particularly to FIG. 1, there are shown sequential steps for carrying out the process in accordance with one embodiment of the present invention. The process is carried out with an apparatus including a pair of identical static bed type furnaces 1 and 1' which are respectively associated with preheaters 2 and 2' connected therewith through gas heating chambers 3 and 3'. In the gas heating chamber 3 and 3', the reducing gas from the preheaters 2 and 2' is added with oxygen or air to be burnt thereby so that the gas is heated to a desired temperature. Further, the furnaces 1 and 1' are also associated with gas coolers 4 and 4', respectively, which function to cool the reducing gas from the furnaces 1 and 1' by water simultaneously separating dusts therefrom and reducing humidity of the gas.

Above the furnaces 1 and 1', there are respectively provided raw material hoppers 5 and 5', which are connected with the furnaces 1 and 1'. Beneath the furnaces 1 and 1', there are provided cooling chambers 6 and 6' which are separately formed from but connected with the furnaces 1 and 1', respectively. A common gas cooler 7 is connected with the cooling chambers 6 and 6' for cooling the gas from the cooling chambers 6 and 6' simultaneously separating dust and reducing humidity. The cooler 7 is connected with a compressor 8 which may be provided with an aftercooler.

When the process in accordance with the present invention is carried out with an apparatus including two furnaces as shown in FIG. 1, a whole cycle of the process is completed in six steps. Referring at first to FIG. 1(A), the material in the first reduction furnace 1 has already been partly reduced and the furnace 1 is under a later reducing step while the material in the second furnace 1' is under a first reducing step. The second cooling chamber 6' contains reduced iron which has been produced in the second reduction furnace 1' in the preceding step.

The process uses a reducing gas mainly containing hydrogen and carbon monoxide and supplied from a reducing gas source 9. In the instance shown in FIG. 1(A), the reducing gas from the gas source 9 is at first passed to the second cooling chamber 6' to cool the hot reduced iron contained therein. The gas from the second cooling chamber 6' is then passed to the cooler 7 to be subjected to cooling, dust separating and drying. A part of the gas from the cooler 7 is recirculated through the compressor 8 to the second cooling chamber 6' and the remaining part of the gas from the cooler 7 is passed through the first preheater 2 and the first heating chamber 3 to the first reduction furnace 1 to reduce the iron oxides therein. The reducing gas from the first reduction furnace 1 is then passed through the cooler 4 to the second preheater 2' wherefrom the gas is passed through the second heating chamber 3' to the second reduction furnace 1' to reduce the material charged therein. The gas from the second reduction furnace 1' is discharged through the second cooler 4' to the discharge line 10. The duration of the step as shown in FIG. 1(A) may be dependent on various design factors but may be approximately 2 hours.

Figure 1B:
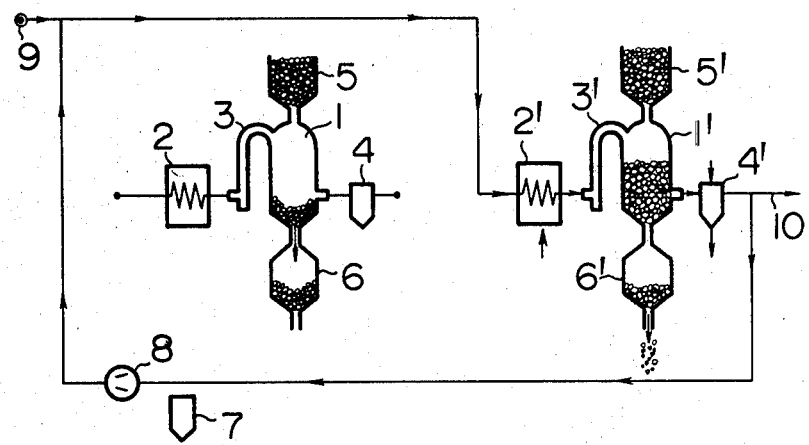

The step shown in FIG. 1(A) is followed by the step shown in FIG. 1(B). In this step, the supply of the reducing gas to the second preheater 2 is interrupted and reduced iron in the first furnace 1 is transferred to the first cooling chamber 6. The reducing gas from the gas source 9 is supplied to the second preheater 2' to be passed through the second heating chamber 3' to the second furnace 1'. The gas from the second furnace 1' is passed to the cooler 4' and the gas from the cooler 4' is in part passed to the compressor 8 to be recirculated and in remaining part to the discharge line 10. The step shown in FIG. 1(B) may be continued for approximately 30 minutes. In this period, the reduced iron in the second cooling chamber 6' is taken out. The hoppers 5 and 5' are filled with raw materials. In this step, since the recirculating gas to the compressor 8 is not required to be passed through the cooler 7 since it has already been passed through the cooler 4'.

Figure 1C:
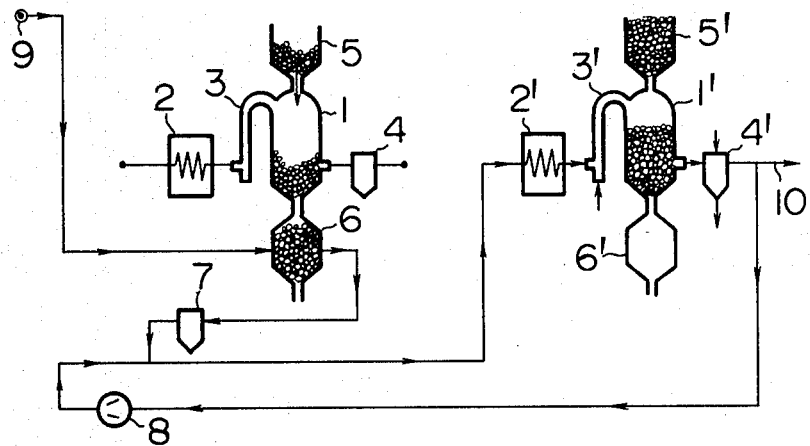

In the step shown in FIG. 1(C) which follows the step shown in FIG. 1(B), the first reduction furnace 1 is charged with the raw material from the hopper 5. The reducing gas from the source 9 is supplied to the first cooling chamber 6 to cool the reduced iron contained therein. The gas from the chamber 6 is passed through the cooler 7 to the second preheater 2' to be supplied through the heating chamber 3' to the second reduction furnace 1'. The gas from the furnace 1' is passed through the cooler 4' and a part of the gas is discharged to the line 10 but the remaining part is recirculated through the compressor 8. The duration of the step in FIG. 1(C) is approximately 30 minutes. Thus, one half of a cycle of the process has been completed. The remaining half of the cycle is carried out as shown in FIGS. 1(D), (E) and (F).

Figure 1D:
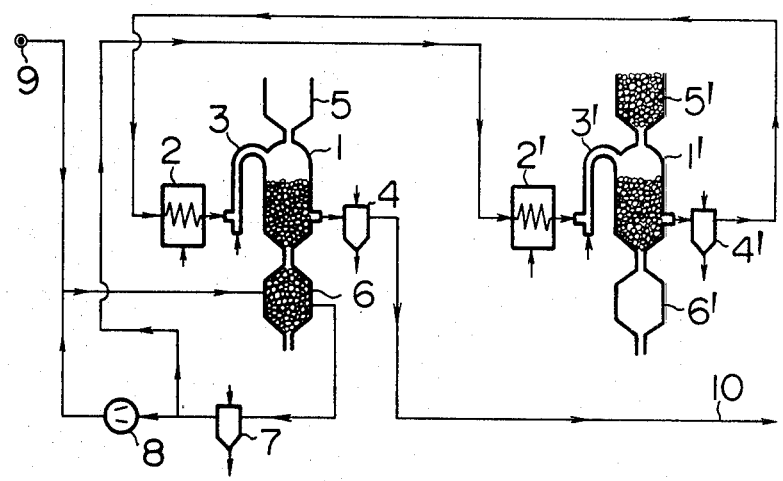

In the step shown in FIG. 1(D), the reducing gas from the source 9 is supplied to the first cooling chamber 6 which contains the reduced iron produced in the preceding step. The gas from the cooling chamber 6 is passed to the cooler 7 wherefrom a part of the gas is passed to the compressor 8 to be recirculated, the remaining part being passed to the second preheater 2' to be supplied through the second heating chamber 3' to the second furnace 1' to reduce the material therein. The gas from the furnace 1' is passed through the cooler 4' to the first preheater 2 to be supplied through the first heating chamber 3 to the first reduction furnace 1. The gas from the furnace 1 is discharged through the cooler 4 to the line 10.

Figure 1E:
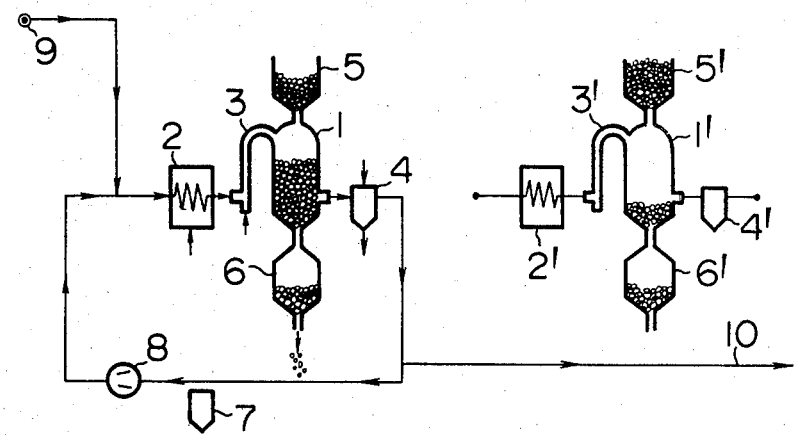

In the step shown in FIG. 1(E), the supply of the reducing gas to the second preheater 2' is interrupted and the material which has been reduced in the second furnace 1' is transferred to the second cooling chamber 6'. The first reduction furnace 1 is supplied with the reducing gas through the first preheater 2 and the first heating chamber 3 to reduce the material therein. The gas from the furnace 1 is passed to the cooler 4 from where the gas is passed in part to the compressor 8 for recirculation and in remaining part to the discharge line 10. The cooled iron in the first cooling chamber 6 is taken out.

Figure 1F:
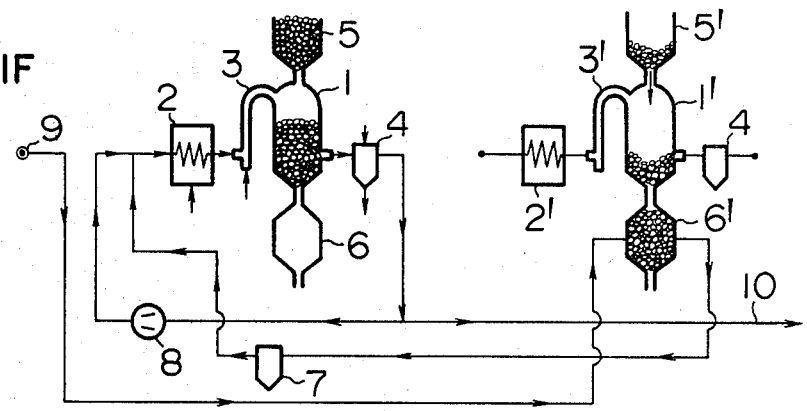
Figure 2:
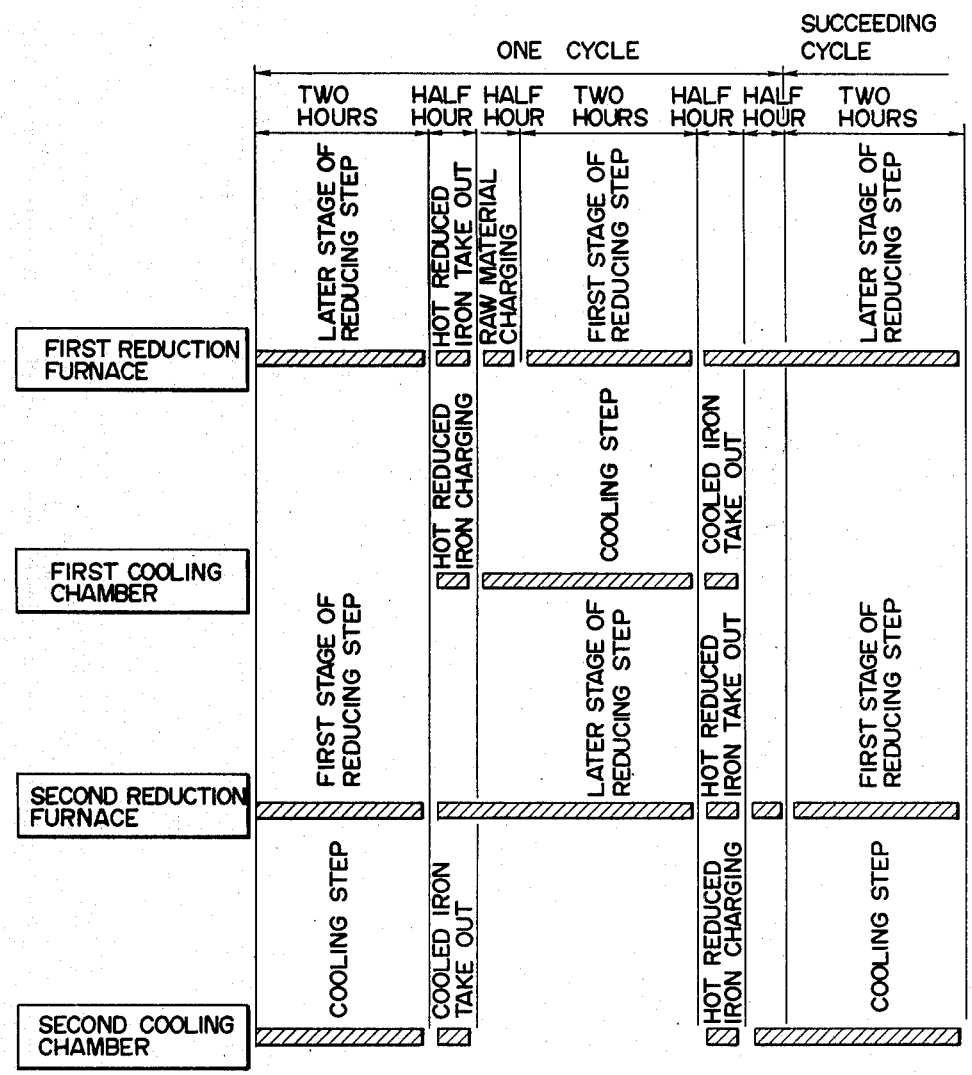
FIG. 2 is a time chart showing the method in FIG. 1.

In the step shown in FIG. 1(F), the second reduction furnace 1' is charged with the raw material from the hopper 5'. The reducing gas from the source 9 is supplied to the second cooling chamber 6' to cool the reduced iron therein. The gas from the second cooling chamber 6' is passed through the cooler 7 to the first preheater 2 to be supplied through the heating chamber 3 to the first reduction furnace 1. The gas from the furnace 1 is passed to the cooler 4 and then in part to the compressor 8 for recirculation and in the remaining part to the discharge line 10. The charging raw material into the first reduction furnace 1' is completed and now one cycle of the operation is accomplished and then the step shown in FIG. 1(A) is started again for next cycle. The sequential steps are shown by a chart in FIG. 2.

The present invention has thus been described with reference to an example with two reduction furnaces in an alternative fashion. In this example, the total time for one cycle is six hours whereas each furnace is in operation for five hours. It should thus be noted that, according to the present invention, the reduction furnaces are used very effectively as compared with conventional processes. In a similar manner, three or more furnaces may be used in an alternate fashion. In the previously described example, the reducing gas from the supply source is used for cooling the hot reduced iron, however, the used gas from the furnace may be used for the purpose.

In this type of iron oxide reduction, it is desirable that the raw material is in the form of pellets of relatively small particle size, such as 5 to 20 mm. Such material in the furnace generally produces a relatively large pressure drop and the higher reducing gas pressure is better for reduction so that the supply pressure of the reducing gas should be as high as possible. A preferable pressure is approximately 4 kg/cm$^2$. As described, a highly combustible gas containing a high percentages of hydrogen and carbon monoxide is utilized for cooling the reduced iron and reducing the iron oxide in the furnace. Since the gas may provide a danger of explosion when it is encountered with air, it is necessary to take measures for introducing an inert gas around the raw material and the reduced iron when they are charged or being taken out. Nitrogen or combustion gas may be used for the purpose.

Figure 3:
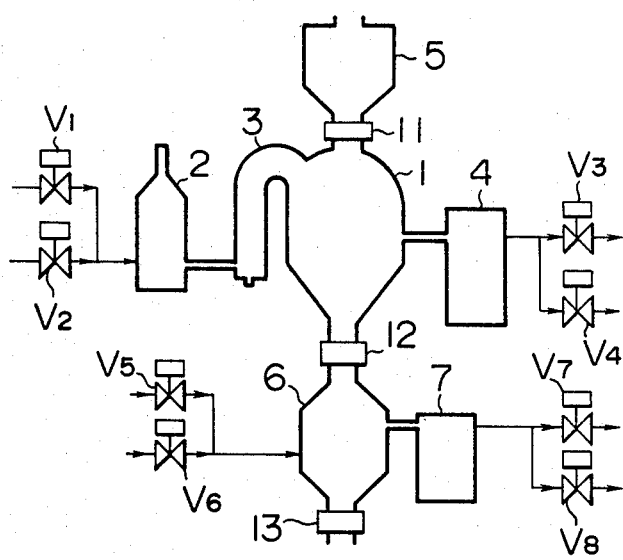
FIG. 3 is a diagrammatical view showing a static bed type reduction system in which the gas in the reactor is purged by inert gas before starting reduction and discharging reduced iron from the reactor.

For example, the reducing gas in the system may be purged by the inert gas as required. FIG. 3 shows an example of the apparatus having conduits for introducing such purging gas. Referring to FIG. 3, there are provided a gate device 11 between the hopper 5 and the reduction furnace 1, a gate device 12 between the furnace 1 and the cooling chamber 6, and a gate device 13 at the discharge port of the cooling chamber 6. In the reducing gas passage to the preheater 2, there is provided a shut-off valve $V_1$. The preheater 2 is further connected with an inert gas supply passage having a shut-off valve $V_2$. The reducing gas passage from the cooler 4 is provided with a shut-off valve $V_3$ and the cooler 4 is further connected with a blow-off passage having a shut-off valve $V_4$.

The reducing gas passage to the cooling chamber 6 is provided with a shut-off valve $V_5$. The cooling chamber 6 is further connected with an inert gas supply passage having a shut-off valve $V_6$. The reducing gas passage from the cooler 7 is provided with a shut-off valve $V_7$. The cooler 7 is further connected with a blow-off passage having a shut-off valve $V_8$. The gate devices and the shut-off valves are controlled by means of a sequence control device so that the steps of the process in accordance with the present invention is carried out.

The operation of the apparatus shown in FIG. 3 will now be described with reference to the steps (A) through (F) shown in FIG. 1.

In the step (A), the reduction furnace 1 is in the later stage of the reducing reaction. Thus, the valves $V_1$ and $V_3$ in the reducing gas passages are opened while the valves $V_2$ and $V_4$ are closed. The gate devices 11, 12 and 13 are also closed. With respect to the cooling chamber 6, the valves $V_5$ and $V_7$ in the reducing gas passages are closed but the valves $V_6$ and $V_8$ are opened for a certain period to substitute the reducing gas in the chamber 6 by an inert gas.

In the step (B), the reducing reaction has been completed in the furnace 1 so that the valves $V_1$ and 3 in the reducing gas passages are closed. Then, the gate device 12 is opened to transfer the reduced iron to the cooling chamber 6. After the reduced iron has been transferred to the chamber 6, the gate device 12 is closed and the valves $V_2$ and $V_4$ are then opened to substitute the gas in the parts 2, 3, 1 and 4 by the inert gas. Thereafter, the valves $V_2$ and $V_4$ are closed.

In the step (C), the valves $V_5$ and $V_7$ are opened to introduce the reducing gas to the cooling chamber 6 to cool the reduced iron. At the same time, the gate device 11 is opened to charge the raw material from the hopper 5 to the furnace 1. At this time, air is introduced together with the raw material into the furnace, however, the furnace is already filled with the inert gas so that there is no danger of explosion. After the raw material has been charged to the furnace 1, the gate device 11 is closed.

In the step (D), the valves $V_1$ and $V_3$ in the reducing gas passages are opened to carry out the first stage of reducing reaction.

In the step (E), the reduced iron in the cooling chamber 6 has already been cooled so that the valves $V_5$ and $V_7$ are closed and the valves $V_6$ and $V_8$ are then opened to purge the reducing gas in the chamber 6 and the cooler 7 by the inert gas. Thereafter, the valves $V_6$ and $V_8$ are closed. Then, the gate device 13 is opened to take out the reduced iron. At this time, the gas in the chamber 6 is also discharged together with the reduced iron and air is introduced into the chamber 6. Since the chamber 6 has already been substituted by the inert gas, there is no danger of explosion in this operation.

In the step (F), the gate device 13 is closed after the reduced iron has been taken out.

Figure 4:
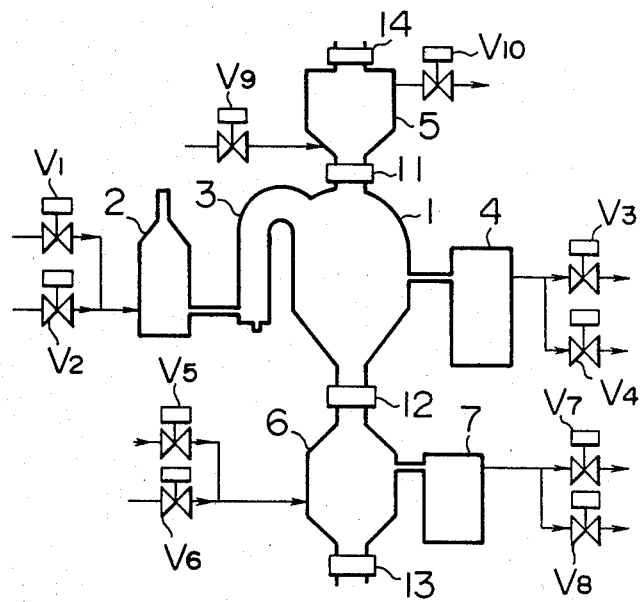
FIG. 4 is a diagrammatical view showing a static bed type reduction system in which the gas in the reactor does not need to be purged before starting reduction and discharging reduced iron from the reactor.

In the aforedescribed process, the gas in the furnace has in advance been substituted by the inert gas so that the combustible gas is not brought into contact with air. In this process, the reduction furnace is in effect cooled by the inert gas during the purging period. Further, a substantial time is spent and a substantial amount of inert gas is consumed in purging the combustible gas or air. In order to avoid the problems, it may be desirable to make it possible to take out the reduced iron and to charge the raw material with the reducing gas maintained as it is. In FIG. 4, there is shown an apparatus designed for such process, with corresponding parts designated by the same reference numerals as in FIG. 3.

In the apparatus shown in FIG. 4, the material hopper 5 is provided at the top thereof with a charging gate device 14. Further, the hopper 5 is connected with an inert gas supply passage provided with a shut-off valve $V_9$ and a blow-off passage provided with a shut-off valve $V_{10}$. The shut-off valves $V_2$ and $V_4$ are not operated in charging into and taking out of the material but are used for shutting down the apparatus for maintenance or the like. A typical operation in the apparatus of FIG. 4 will now be described taking reference to the steps (A) through (F) in FIG. 1.

In the step (A), the reduction furnace 1 is in the later stage of the reducing reaction so that the valve $V_1$ and $V_3$ are opened. The valves $V_2$ and $V_4$ are maintained closed throughout the process. The gate devices 11, 12, 13 and 14 are also closed. The valves $V_5$ and $V_7$ in the cooling gas passages are closed and the valves $V_6$ and $V_7$ are opened for a certain period to introduce the inert gas into the cooling chamber 6.

In the step (B), the valves $V_1$ and $V_3$ in the reducing gas passages are closed and the gate device 12 is opened to transfer the reduced iron to the cooling chamber 6. Then, the gate 12 is closed after the reduced iron has been transferred to the chamber 6. In the furnace, there is remained reducing gas and a part of the inert gas in the chamber 6 is allowed to flow into the furnace 1.

In the step (C), the valves $V_5$ and $V_7$ in the reducing gas passages are opened to cool the reduced iron in the chamber 6. At the same time, the gate device 11 is opened to charge the raw material in the hopper 5 into the reducing furnace 1. In this instance, the gas in the hopper 5 is introduced into the furnace 1, however, since the hopper 5 is filled with the inert gas, there is no danger of explosion. After the raw material has been charged to the furnace 1, the gate device 11 is closed.

In the step (D), the valves $V_1$ and $V_3$ are opened to carry out the first stage of the reducing reaction. At the same time, the valves $V_9$ and $V_{10}$ are opened to purge the gas in the hopper 5 by the inert gas. Then, the valves $V_9$ and $V_{10}$ are closed.

In the step (E), the reduced iron in the chamber 6 has already been closed and the valves $V_5$ and $V_7$ are therefore closed. Then, the valves $V_6$ and $V_8$ are opened to fill the cooling chamber 6 and the cooler 7 with the inert gas. Thereafter, the valves $V_6$ and $V_8$ are closed. Then, the gate device 13 is opened to take out the reduced iron. The gate device 14 of the hopper 5 may at this moment be opened to charge the raw material into the hopper 5 and the gate device 14 is thereafter closed. The valves $V_9$ and $V_{10}$ are then opened to fill the hopper 5 with the inert gas.

In the step (F), the gate device 13 is closed after the reduced iron has been taken out. The valve $V_9$ and $V_{10}$ are then closed after the gas in the hopper 5 has been purged by the inert gas.

It should be understood that the apparatus shown in FIG. 4 is advantageous over the apparatus in FIG. 3 in that the consumption of the inert gas can be decreased and that the process time can be shortened. Further, the thermal efficiency can also be increased.

In the apparatus shown in FIGS. 3 and 4, the cooling chamber 6 has been filled with an inert gas before the reduced iron in the chamber is taken out. However, in an alternative process, the cooling chamber may not necessarily be filled with such inert gas but a region of inert gas is formed at the discharge end portion of the cooling chamber by blowing the inert gas to the discharge end portion so as to prevent the combustible gas in the cooling chamber 6 from blowing out or the atmospheric air from entering the chamber 6. Alternatively, a curtain of the inert gas may be formed at the discharge end portion of the cooling chamber 6.

Figure 5:
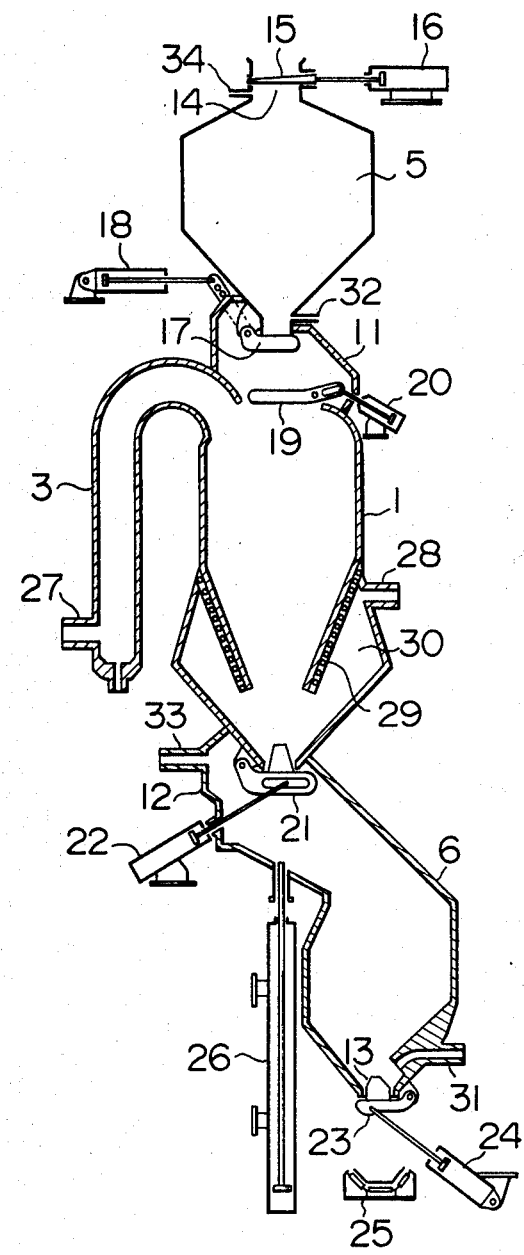
FIG. 5 is a diagrammatical view showing an apparatus in which a material hopper and a cooling chamber are associated with each reduction furnace.

Referring now to FIG. 5, there is shown an example of the reduction furnace which may be used for carrying out the process in accordance with the present invention. In FIG. 5, the reduction furnace 1 formed as a unit with a heating chamber 3 and provided at the top portion with a hopper 5 with an intervention of a gate device 11. At the lower portion of the furnace 1, there is formed a gate device 12 which continues to a cooling chamber 6. The hopper 5 is formed at the top portion thereof with a gate device 14 including a closure 15 and an actuator 16 therefor.

The gate device 11 between the hopper 5 and the furnace 1 is comprised of a closure 17, an actuator 18 for the closure 17, a heat shield 19 and an actuator 20 therefor. The gate device 12 between the furnace 1 and the cooling chamber 6 is comprised of an exit closure 21 and an actuator 22 therefor. The gate device 13 at the discharge port of the cooling chamber 6 includes a closure 23 and an actuator 24 therefor. Beneath the gate device 13, there is provided a conveyor 25. At the lower portion of the furnace 1, there may be provided a breaking bar assembly 26 which can be used for breaking the reduced iron which is clogged in the furnace 1.

The reduction furnace 1 and the cooling chamber 6 are lined by refractory materials. The heating chamber 3 is formed at the lower portion with a reducing gas inlet 27 and the furnace 1 is formed with a gas outlet 28 at an outlet port section 30 defined by a furnace lower wall 29. The cooling chamber 6 is provided with a gas inlet 31 and a gas outlet 33. The hopper 5 is provided with a gas inlet 32 and a gas outlet 34.

Figure 6:
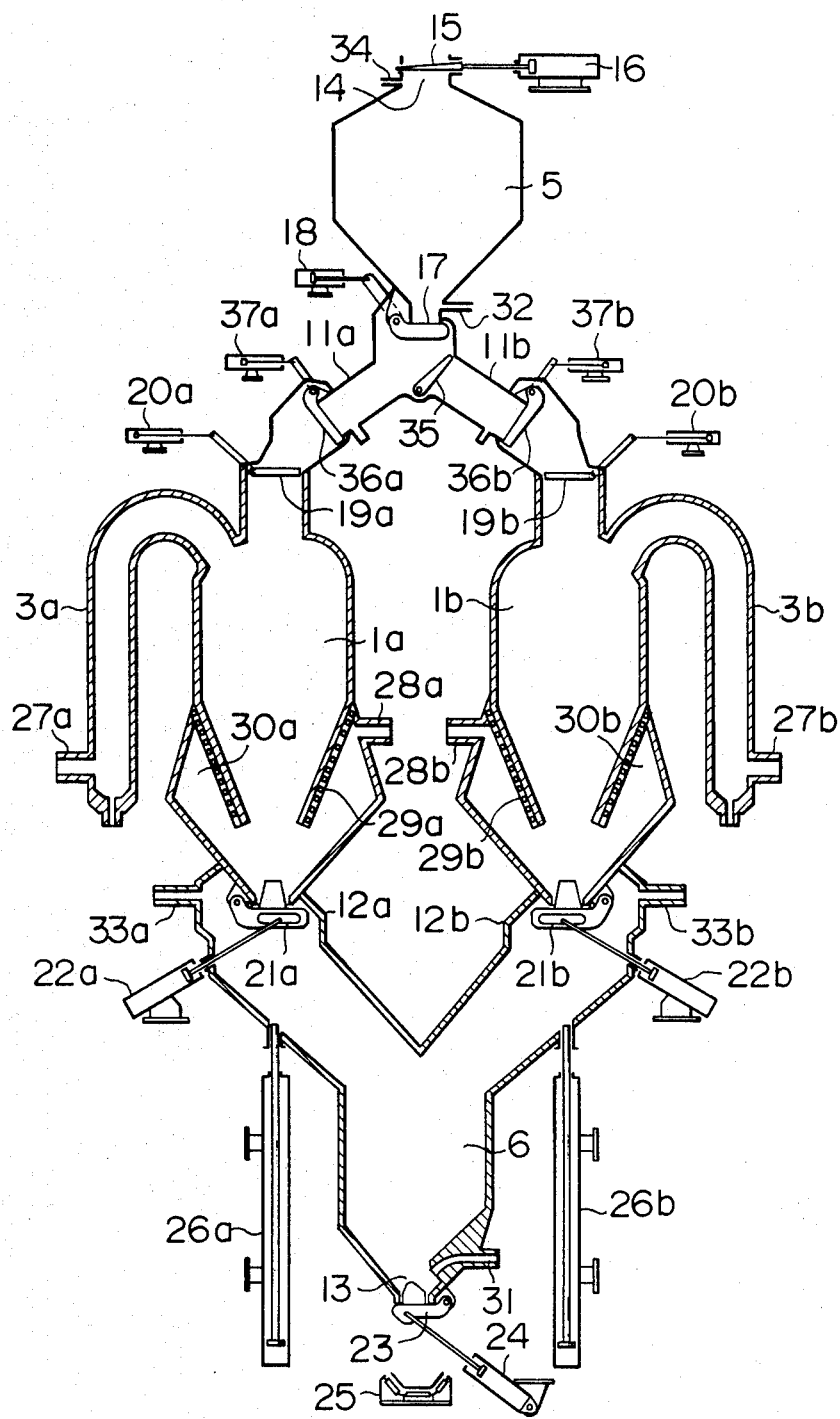
FIG. 6 shows an apparatus in which two reduction furnaces are associated with a single hopper and a single cooling chamber.

Referring to FIG. 6, there is shown another example of the apparatus in which a hopper 5 and a cooling chamber 6 are associated with two reduction furnaces $1a$ and $1b$. At the discharge end portion, the hopper 5 is provided with a switching damper 35 which leads to branched paths $11a$ and $11b$ respectively provided with valves $36a$ and $36b$ and actuators $37a$ and $37b$ therefor. In order to maintain a relatively high pressure in the furnaces, particular considerations must be made in designing the gate structures.

In the example shown in FIG. 5, the gate device 11 between the hopper 5 and the furnace 1 may be provided with a locking mechanism since a satisfactory sealing cannot be established by simply closing the closure 17. In order to protect the mechanism from the high temperature gas in the furnace, there is provided a heat shield 19. In the example of FIG. 6, the valves $36a$ and $36b$ are provided with locking mechanisms and protected by heat shields $19a$ and $19b$ from the heat in the furnaces.

Figure 7:
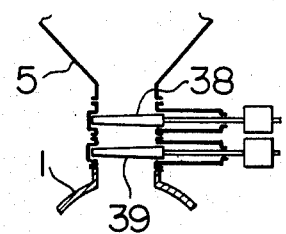
FIG. 7 is a diagrammatical view showing a gate structure which may be used in the apparatus of the present invention.

Referring to FIG. 7, there is shown an example of the gate device 11 in which a pair of gate plates 38 and 39 are provided in parallel. The gate plate 38 functions to prevent the raw material in the hopper 5 from being moved to the furnace 1 but may not have a gas sealing function. The gas seal is provided by the gate plate 39. The double gate structure may be operated by opening at first the gate plate 39 and then the gate plate 38 for introducing the raw material into the furnace 1. For closing, the gate plate 38 is actuated in advance to the gate plate 39. With this manner of operation, the raw material contacts with only the gate plate 38 and the gate plate 39 does not suffer from a damage by the moving raw material and therefore the gate plate 39 can always shut off the gas. The gate 38 can be substituted by a cut gate.

Figure 8:
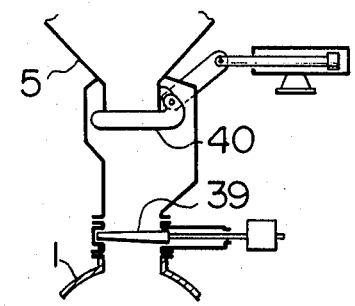
FIG. 8 shows another type of gate structure.
Figure 9:
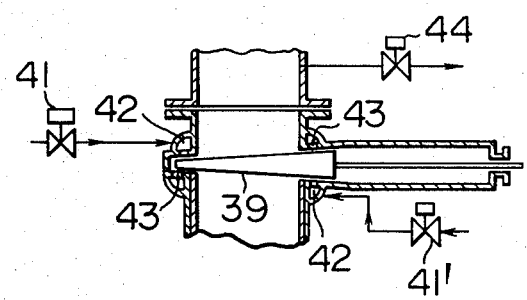
FIG. 9 shows a further type of gate structure having a gas sealing function; and, FIG. 10 shows an example of gate structure which may be used between the reducing furnace and the cooling chamber.

FIG. 8 shows another example of the gate device 11. In this example, the gate plate 38 in the example of FIG. 7 is substituted by a closure 40 which may be similar to the closure 17 in the mechanism shown in FIG. 5 or 6. FIG. 9 shows an example of gate device which has an inert gas supply system for cleaning the seat area of the gas seal gate 39. The gas supply system includes gas supply passages which have gas valves 41 and 41', respectively, and are connected with gas injecting headers 42 having injection nozzles 43 directed to the gate plate 39. The valves 41 and 41' may be opened automatically or manually as desired to inject the inert gas through the nozzles 43 to blow off any dust which may be deposited on the sealing seat of the gas seal gate 39.

A gas discharge valve 44 may also be provided as shown in FIG. 9. Then, the apparatus may be operated with the valves 41 and 44 opened so that the inert gas is supplied to the header 42 and passed through the nozzles 43 to the discharge valve 44 to isolate the hopper from the furnace 1. The gate device 11 may be provided with a bell-shaped distributor of a known type so that the raw material is uniformly distributed in the furnace 1.

Figure 10:
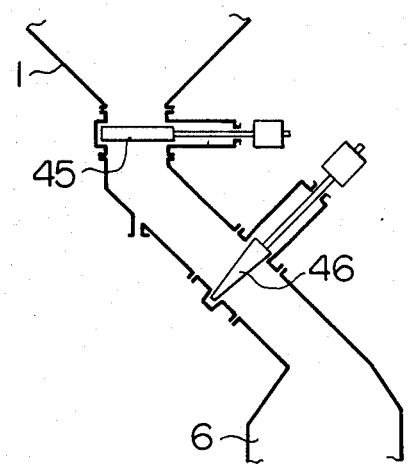

Referring to FIG. 10, there is shown an example of the gate device 12 which is comprised of gate plates 45 and 46. The gate plate 45 is provided to block the material in the furnace 1. It is therefore not required that the gate plate 45 has a gas sealing function. Any type of blocking device may therefore be used instead of the gate plate 45. The gas seal is provided by the gate plate 46. In this type of gate device, it is possible to protect the gate plate 46 against damages by the material and dusts so that a reliable gas sealing can be maintained. A more preferable result will be obtained by associating the gate 46 with an inert gas blowing device as shown in FIG. 9.

From the above descriptions, it will be understood that, according to the present invention, only two or three reduction furnaces may be combined for performing one complete cycle of the process continuously. This is a significant advantage over the process as taught by U.S. Pat. No. 3,136,623 in which four furnaces are required. Therefore, it is possible to decrease the investment for the iron manufacturing plant although the present invention requires to provide one or more cooling chambers.

According to the process of the present invention, cooling of the reduced iron is not performed in the reduction furnace but the hot reduced iron is taken out of the furnace so as to make it possible to use the furnace for the succeeding reducing step. Therefore, it is possible to prevent the furnace wall from being cooled resulting in a decrease in the fuel consumption. It is also possible to decrease the process time because it is unnecessary to cool and warm up the furnace wall between each cycle of the process.

The reduced iron can be cooled in a better manner than in conventional processes because the cooling is carried out in a chamber specifically designed for the purpose. Thus, it is possible to carry out the whole process in a more economical way.

The invention has thus been shown and described with reference to specific examples, however, it should be noted that the invention is in no way limited to the details of the illustrated examples but changes and modifications may be made without departing from the scope of the appended claims.

We claim:

1. A method for producing iron comprising charging into a static bed type furnace means raw materials containing iron oxides, maintaining said raw materials in a static bed within said furnace means, applying a reducing agent to said static bed of raw materials at an elevated temperature sufficient to and for a time necessary to reduce said iron oxides to iron, transferring said reduced materials prior to substantial cooling thereof to a cooling chamber means maintained separate from said furnace means and cooling said iron-containing materials wherein said reducing agent is gaseous, the raw materials charging step is immediately preceded by a step of filling the furnace means with inert gas and the transferal of reduced materials to the cooling chamber is immediately preceded by a step of filling the cooling chamber means with inert gas.

2. A method for producing iron comprising charging into a static bed type furnace means raw materials containing iron oxides, maintaining said raw materials in a static bed within said furnace means, applying a reducing agent to said static bed of raw materials at an elevated temperature sufficient to and for a time necessary to reduce said iron oxides to iron, transferring said reduced materials prior to substantial cooling thereof to a cooling chamber means maintained separate from said furnace means and cooling said iron-containing materials wherein said reducing agent is gaseous, the raw materials are charged into said furnace means from a hopper means which had been filled with inert gas immediately prior to being filled with said raw materials and the transferal of reduced materials to the cooling chamber is immediately preceded by a step of filling the cooling chamber means with inert gas.

3. A method for producing iron comprising filling hopper means with raw materials containing iron oxides, sequentially charging batches of said raw materials into a plurality of static bed type furnace means, maintaining said raw materials in static beds within said furnace means, sequentially applying reducing gas to said beds of raw materials under elevated temperatures sufficient to and for a time necessary to reduce said iron oxides to iron said sequential application of reducing gas being such that reduction in a particular furnace means is not initiated until reduction in the immediately preceding furnace means in said sequence is substantially half completed, sequentially transferring said batches of sequentially reduced materials prior to substantial cooling thereof to a single cooling chamber means maintained separate from but in communication with each of said furnace means and sequentially cooling said reduced materials.

4. The method of claim 3 wherein the raw materials charging step is immediately preceded by a step of filling the furnace means with inert gas and the transferal of reduced materials to said cooling chamber means is immediately preceded by a step of filling the cooling chamber means with inert gas.

5. The method of claim 3 wherein said hopper means is filled with inert gas immediately prior to being filled with said raw materials and the transferal of reduced materials to the cooling chamber means is immediately preceded by a step of filling the cooling chamber means with inert gas.

6. Iron manufacturing apparatus comprising a plurality of static bed type reduction furnaces, at least one material hopper associated with the furnaces for charging raw materials containing iron oxides into the associated furnace, at least one cooling chamber associated with the furnaces for receiving materials therefrom, means for passing a reducing gas into selected one of the furnaces, and means for passing a reducing gas to the cooling chamber for cooling the reduced iron therein.

7. Apparatus in accordance with claim 6 in which circulating conduit means is provided for leading the reducing gas from the cooling chamber to the furnaces so that the gas is used for reducing reaction in the furnaces.

8. Apparatus in accordance with claim 6 in which hopper means is associated with the furnaces, gate means between the hopper means and the furnaces comprising means for blocking raw materials in the hopper means against movement to the furnaces and gas seal means beneath the blocking means for preventing gas flow between the hopper means and the furnaces.

9. Apparatus in accordance with claim 8 in which inert gas injecting means is provided in association with the gas seal means in the gate means so as to clean the gas seal means.

* * * * *